United States Patent [19]

Liu

[11] Patent Number: 6,058,306

[45] Date of Patent: May 2, 2000

[54] COMPENSATION OF DYNAMIC DOPPLER FREQUENCY OF LARGE RANGE IN SATELLITE COMMUNICATION SYSTEMS

[75] Inventor: Qinchong Liu, Ann Arbor, Mich.

[73] Assignee: Hughes Electronics Corporation, El Segundo, Calif.

[21] Appl. No.: 09/310,477

[22] Filed: May 12, 1999

Related U.S. Application Data

[60] Provisional application No. 60/106,561, Nov. 2, 1998.

[51] Int. Cl.[7] .............................. H04Q 7/20; H04B 7/185
[52] U.S. Cl. ......................... 455/427; 455/429; 455/430; 455/10; 455/12.1; 455/13.1; 455/67.6; 342/357.05; 342/358
[58] Field of Search ..................................... 455/427, 429, 455/430, 10, 12.1, 13.1, 67.6; 342/357.05, 358

[56] References Cited

U.S. PATENT DOCUMENTS

| | | | |
|---|---|---|---|
| 5,463,400 | 10/1995 | Tayloe | 342/352 |
| 5,742,908 | 4/1998 | Dent | 455/12.1 |
| 5,867,765 | 3/1995 | Nilsson | 455/13.1 |
| 5,926,745 | 8/1996 | Threadgill et al. | 455/12.1 |
| 5,943,606 | 9/1996 | Kremm et al. | 455/12.1 |
| 5,995,832 | 3/1990 | Mallinckrodt | 455/12.1 |

Primary Examiner—Fan Tsang
Assistant Examiner—Simon Nguyen
Attorney, Agent, or Firm—John T. Whelan; Michael W. Sales

[57] ABSTRACT

A communication system and a method of providing a feeder link to an earth orbiting satellite transponder having a mobile link illuminating spot beams with associated access channels, control channels and traffic channels for multiple user terminals (UTs) using the satellite transponder as the reference point to correct for dynamic frequency errors including the Doppler in the feeder link and in the mobile link caused by the satellite motion and the satellite translation error. A satellite access node (SAN) includes one or several radio frequency terminals (RFTs) and a satellite basestation subsystem (SBS). The RFT performs the center Doppler correction for each of the channels of the feeder link to the satellite transponder. The SBS corrects the feeder link residual Doppler and the satellite translation error for each channel and calculates the Doppler in the mobile link between the satellite transponder and the median Doppler line of each spot beam on the earth or each UT. The SBS measures the differential Doppler of the UT relative to the median Doppler line and derives its fractional Doppler, and uses the fractional Doppler to determine the position of the UT and calculate its Doppler of the traffic channels in the mobile link. The UT corrects the mobile link Doppler under the guidance of the SBS.

24 Claims, 7 Drawing Sheets

COMPENSATION OF DYNAMIC DOPPLER FREQUENCY OF LARGE RANGE IN SATELLITE COMMUNICATION SYSTEMS

CROSS-REFERENCE TO RELATED APPLICATION

This application claims benefit of U.S. Provisional Application Ser. No. 60/106,561, filed Nov. 2, 1998.

BACKGROUND OF THE INVENTION

1. Field of the Invention

The present invention relates to satellite communication systems in which Doppler frequency shift may cause serious degradation of demodulation performance and nonnegligible waste of system bandwidth. More particularly, the invention relates to systems providing a feeder link to an earth orbiting satellite transponders such as medium earth orbit satellite (MEOS) communication systems and low earth orbit satellite (LEOS) communication systems having a mobile link illuminating many spot beams with associated access and control and traffic channels for multiple user terminals on the earth where Doppler frequency shift caused by satellite motion is on the order of dozens of kilohertz and also varying with time.

2. Background and Description of Related Art

Typically, the propagation delay and Doppler shift are derived from a radio-frequency (RF) carrier transmitted between mobile communications systems and a moving transceiver, for example, a transceiver included on a moving airplane or satellite. The Doppler shift is a well known physical phenomenon which based on signal propagation delay represents the observed change in frequency of the propagated RF wave that occurs due to the relative motion between the mobile unit and the transceiver. The measured signal propagation delay is the amount of time required for an electromagnetic signal to travel between the communication devices of the system.

Conventional satellite communication systems typically use guard bands at the edges of the useable bandwidth to combat the effects of Doppler shift in earth orbiting satellite systems. This approach causes a considerable waste of the useable system bandwidth in such communication systems, e.g., those employing MEOS and LEOS satellites. For example in a typical system which employs a MEOS satellite, the mobile link Doppler is in the range of approximately +/−11 kHz. To make sure adjacent channels will not overlap, these prior systems use 25 kHz guard bands for every 150 kHz, i.e., having a waste of 25/(25+150)=14.29% of the useable system bandwidth. Where such approaches are applied to LEO satellite communication systems, the percentage of bandwidth waste is expected to be much higher. It would be desireable therefore to provide a system in which effectively 100% of the system bandwidth is used while maintaining zero frequency error.

To this end, it would be desireable first to compensate for the frequency errors dominated by large Doppler frequency shift in satellite communication systems, so that the received frequency at the input of demodulator has negligible error. Secondly, it would be desireable to employ the Doppler frequency shift compensation to effectively use system bandwidth to 100%, i.e., eliminating guard band in conventional systems, which is particularly desirable in wireless communication applications. In MEOS communication systems and LEOS communication systems, Doppler frequency shift caused by satellite motion is on the order of dozens of kilohertz and also varying with time. If not compensated, this Doppler can cause failure of communication or serious demodulation degradation.

SUMMARY OF THE INVENTION

To correct for the frequency errors caused by Doppler frequency shift due to satellite motion, satellite translation error, clock drift of the user terminal (UT) and the like, methods are provided which allow the whole satellite communication system to operate in a closed-loop fashion for dynamic frequency control. The satellite access node (SAN) of the system includes the radio frequency terminal (RFT) and the satellite basestation subsystem (SBS) for use with satellites and the mobile UTs. The RFT and the SBS correct feeder link Doppler and satellite translation error. The UT compensates mobilelink Doppler and frequency error caused by UT clock drift. Because all of the frequency errors in system are compensated, the frequency error at the input of the demodulator inside either the SBS or the UT is negligible, minimizing degradation in demodulation performance caused by frequency errors. This approach may be directly applied in mobile satellite communication systems as well as geosynchronous earth orbit (GEO) systems to save bandwidth and improve demodulation performance. Therefore, it has the advantages of using system full bandwidth without degradation in demodulation performance caused by frequency errors.

Unlike traditional designs, however, the described closed-loop system does not require guard bands to combat the effects of Doppler shift. Therefore, system bandwidth is used up to 100%. The RFT performs the feeder link center Doppler correction for all of the channels. The SBS precorrects the feeder link residual Doppler and satellite translation error for all of the channels. For the control channels, the SBS also precorrects the Doppler frequency shift in the mobile link relative to the median Doppler line of each spot beam. So when the signal of each control channel is received by any UT on the median Doppler line of each spot beam, its carrier frequency is the preassigned nominal frequency. This reduces the search range of the UT in the stage of synchronization to about [−1 kHz, 1 kHz].

For the access channels, the SBS calculates the corresponding Doppler frequency shift in the mobile link at the median Doppler line and broadcasts it to UT. The UT precompensates this Doppler frequency shift when sending access request. The SBS derives the fractional UT Doppler frequency shift from the measured frequency offset of the UT access signal. Using the measured fractional Doppler of the UT, the SAN calculates the Doppler frequency shifts of the traffic channels (TCH) in mobile link for both forward and return links, which are sent to the UT through the access grant channel (AGCH). The UT then precompensates these Doppler frequency shifts when sending and receiving TCH signals.

This system provides that the received TCH frequency by the satellite is always the nominal TCH frequency assigned by the local satellite resource management center (SRMC). Also the input of the demodulator inside either the SBS or the UT the frequency offset is negligible. Therefore, this design makes optimal use of system bandwidth with negligable degradation of demodulation performance caused by frequency error.

Briefly summarized, the present invention relates to a communication system and a method of providing a feeder link to an earth orbiting satellite transponder having a mobile link illuminating several or many spot beams with associated access channels, control channels and traffic channels for multiple user terminals (UTs) on the earth. The satellite transponder is used as the reference point to correct for all of the dynamic frequency errors including the Doppler in the feeder link and in the mobile link caused by the satellite motion and the satellite translation error. A satellite access node (SAN) includes one or several radio frequency terminals (RFTs) and a satellite basestation subsystem (SBS). Two pilot tones are used to measure the instantaneous fractional Doppler between the RFT and the satellite transponder and the instantaneous satellite translation error. The RFT performs the center Doppler correction for each of the channels of the feeder link to the satellite transponder. The SBS corrects the feeder link residual Doppler and the satellite translation error for each channel and calculates the Doppler in the mobile link between the satellite transponder and the median Doppler line of each spot beam on the earth or each UT. The SBS uses the calculated Doppler frequency shift in the mobile link to establish a forward link to the user terminals via the satellite transponder such that when the signal of each control channel is received by any user terminal on the median Doppler line of each spot beam, the carrier frequency of the control channel is received by the user terminal at a preassigned nominal frequency. The method uses the control channel to broadcast information identifying an access channel frequency and the associated Doppler in the mobile link relative to the median Doppler line for the user terminals. This facilitates return links over the access channel for closed-loop dynamic frequency control via the satellite transponder using the identified access channel frequency and the calculated Doppler frequency shift in the mobile link with precompensation of the carrier frequency of the access channel by the user terminal for optimal use of the access channel bandwidth and optimal differential Doppler measurement in the SBS. The method further measures the differential Doppler of each UT over the access channel at the SBS, derives its fractional Doppler, and uses the derived fractional Doppler to calculate the Doppler of the traffic channels and to locate the position of the UT. The UT uses the calculated Doppler to compensate for the Doppler in the traffic channels in both forward link and return link, which facilitates the closed-loop dynamic frequency control via the satellite transponder for the traffic channels to use system bandwidth optimally. Through employing the two closed-loops dynamic frequency control, the method provides the optimal performance in achieving zero frequency error at the input of the demodulator inside the SBS, or on board the satellite, or inside the UT.

These and other advantages are realized with the described compensation of large Doppler frequency in satellite communication systems. The invention's advantages may be best understood from the following detailed description taken in conjunction with the accompanying drawings.

DESCRIPTION OF THE PREFERRED EMBODIMENTS

Figure 1:
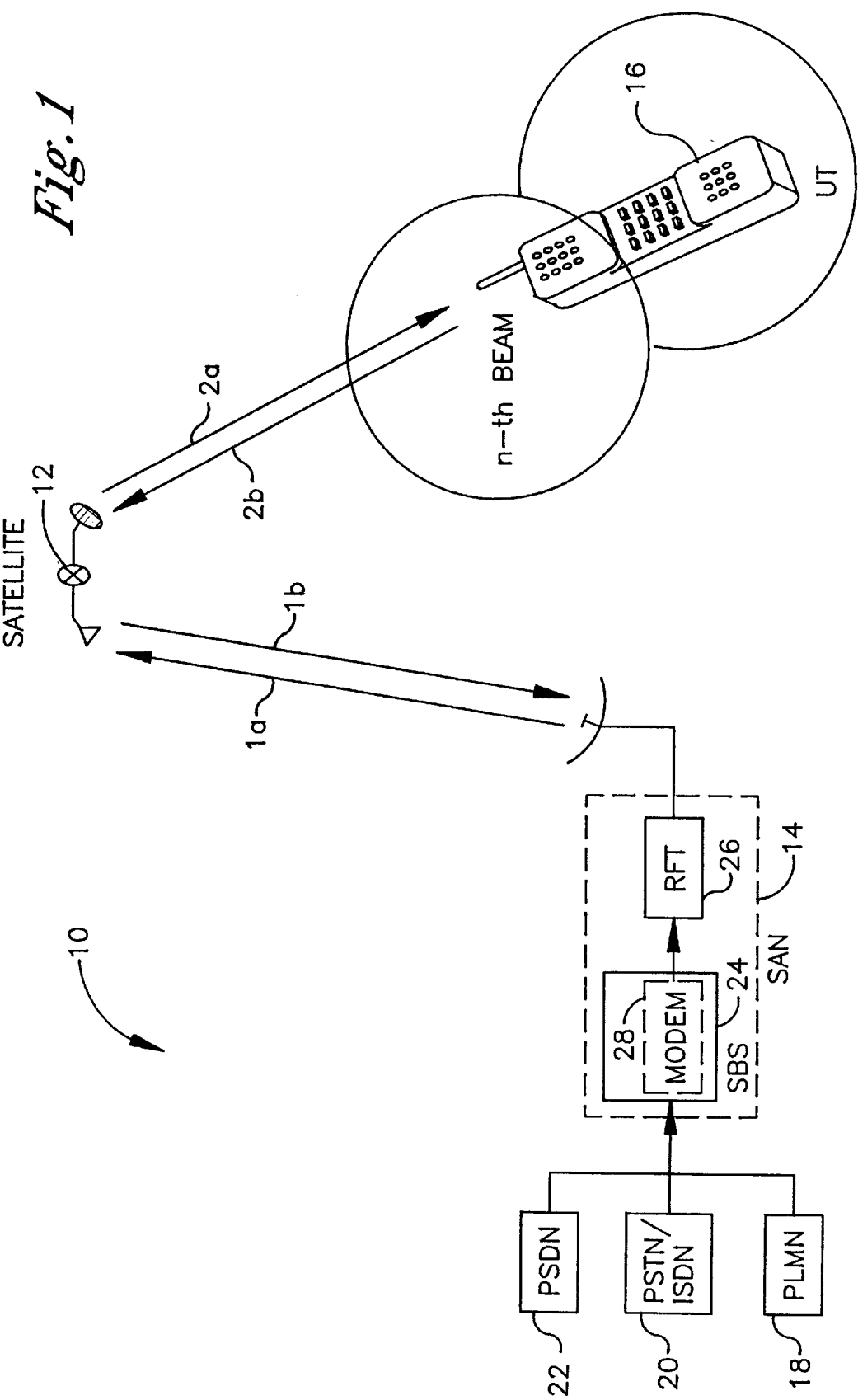
FIG. 1 is a block diagram of a satellite communication system in accordance with the invention.

Turning now to the drawings, and in particular to FIG. 1, a satellite communications system 10 in accordance with one embodiment of the invention is illustrated. The system 10 includes a satellite 12, a terrestrial-based user terminal (UT) 16 (one show, system includes thousands of UTs) and a ground station, e.g., a satellite access node (SAN) 14 discussed below. The ground station is in radio frequency (RF) communication with the satellite 12. The ground station can communicate with another UT 16 via the RF communication link with the satellite 12. The UT 16 may be a mobile handset or any other device suitable for satellite communications. The satellite 12 may be a communications satellite having a phased array antenna (not shown) capable of emitting a plurality of spot beams onto the surface of the earth. The ground station typically includes a subsystem, e.g., for tracking the satellite's position and velocity relative to a predetermined coordinate system, such as the earth-centered, earth-fixed (ECEF) coordinate system. The satellite tracking can be accomplished using conventional techniques; and satellite position and velocity can be obtained via real-time tracking or predicted periodical tracked data. Well-established techniques of astro-dynamics are used to obtain data on the position and velocity of the satellite.

As described herein, the communication system 10 provides a feeder link to an earth orbiting satellite transponder having a mobile link illuminating many spot beams with associated access and control channels for multiple UTs using the satellite 12 as a reference point to correct for dynamic Doppler of large range caused by satellite motion. Information broadcasts over control channels identify access channel frequencies and the Doppler frequency shift in the mobile link relative to the median Doppler line for the user terminals, which facilitates return links over the access channel for closed-loop dynamic frequency control via the satellite transponder using the identified access channel frequency and the calculated Doppler frequency shift in the mobile link with precompensation of the carrier frequency of the access channel by the user terminal for efficient use of the access channel bandwidth.

In the satellite communication system 10, the satellite 12 and the satellite access node (SAN) 14 are used to connect UT 16 to a public land mobile network (PLMN), public switched telephone network (PSTN), an integrated services digital network (ISDN) 20, and public switched data network (PSDN) 22, etc. As illustrated in FIG. 1 each SAN 14 includes a satellite basestation subsystem (SBS) 24, which processes calls and data packets, and a radio frequency terminal (RFT) 26. The RFT converts the output signal of a modem 28 which resides in the SBS 24 into feeder link signal with much higher carrier frequency and power, and vice versa. The SAN 14 includes the RFT 26 and SBS 24 for performing Doppler correction for each of the channels of the feeder link to the satellite transponder, and the SBS 24 for calculating Doppler frequency shift in the mobile link between the satellite transponder and a median Doppler line of each spot beam on the earth and between the satellite transponder 12 and the UTs 16.

The SBS 24 also uses the calculated Doppler frequency shift in the mobile link to establish a forward link to the UTs 16 via the satellite transponder 12 such that when the signal of each control channel is received by any user terminal on the median Doppler line of each spot beam, the carrier frequency of the control channel is received by the UT 16 at a preassigned nominal frequency. The radio frequency link between the RFT 26 and the satellite 12 is called the feeder link, denoted by 1a and 1b. The radio frequency link between the satellite 12 and the UT 16 is called the mobile link, denoted by 2a and 2b. The connection 1a and 2a is called the forward link, while 2b and 1b is called the return link. In recent years MEOS and LEOS have been considered to carry signals for large population of simultaneous users in commercial applications. As MEOS and LEOS are moving at speed of tens of kilometers per second relative to earth, this motion can introduce Doppler frequency shift on the order of dozens of kilohertz. Also this Doppler shift is varying during a call. If not corrected or (pre)compensated for before demodulation, this Doppler frequency shift will cause serious degradation of demodulation performance and frequent failure of radio link. Furthermore, a large waste of system bandwidth can result if Doppler frequency compensation is not performed carefully. Therefore compensating Doppler frequency shift caused by fast motion of satellite is becoming a challenging topic in satellite communications.

Although satellite communication systems employing CDMA modulation schemes have the same problem, compensating Doppler frequency shift is more critical for TDMA based satellite communication systems in which each channel usually has a bandwidth of 30 kHz or less. The described embodiment is directed particularly to narrow band applications, e.g., time division multiple access (TDMA) and frequency division multiple access (FDMA) based satellite communication systems, although the same concepts can be applied to spread spectrum applications such as code division multiple access (CDMA) based satellite communication systems.

Figure 2:
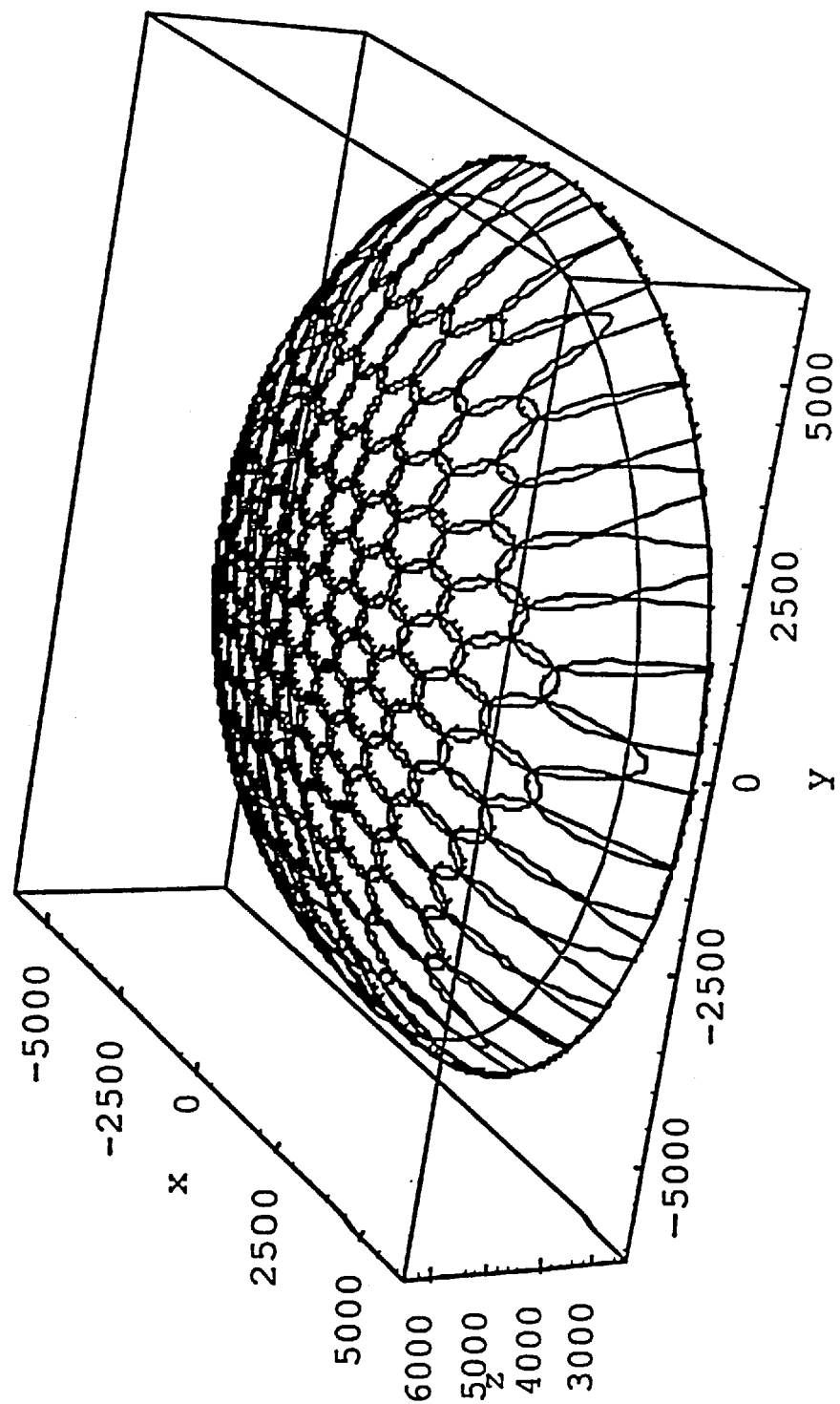
FIG. 2 shows spot beams of one satellite at a time instant on the earth surface.

Doppler frequency shift of the feeder link is different from associated with the mobile link for two main reasons. Firstly, the satellite motion relative to SAN is different than its motion relative to the UT. Usually the locations of SANs on the earth are fixed. On the contrary a UT can be moving in any of the hundreds of spot beams associated with each satellite. When satellite is moving relative to the earth, these spot beams are also moving relative to the earth. As a result, fractional Doppler, which is defined as the value of the Doppler frequency shift divided by the carrier frequency, is the same for all the channels in feeder link, while in mobile link it varies from UT to UT and from spot beam to spot beam. Secondly, the feeder link carrier frequency is different than the carrier frequency for mobile link in order to avoid interference between these two links at the receiver on board satellite. Usually one satellite has hundreds of spot beams in mobile link to provide service to large number of users as shown in FIG. 2. The relative motion of the satellite to each spot beam is different due to satellite motion and the spinning of the earth. This motion difference can cause a large variety of Doppler frequency shift among all of the beams. The spot beam which has 90 degrees of elevation angle has zero Doppler frequency shift, while the spot beams which have elevation angles around 10 degrees or less may have dozens of kilohertz of Doppler frequency shift. For example, in a predominant global mobile satellite communication system the range of Doppler frequency shift is [−11 kHz, +11 kHz] for all of its 163 spot beams associated with each satellite. Therefore, for mobile link Doppler correction must be performed on spot beam basis, while for the feeder link the dominating Doppler correction can be done once for all the channels. Because the feeder link carrier frequency is different than that in mobile link, the transponder on board satellite has to translate feeder link carrier frequency to mobile link carrier frequency and vice versus. These translations may introduce frequency error, which is called satellite translation error and usually on the order of dozens of hertz. The satellite translation error must also be compensated before demodulation.

The most challenging work in dealing with large Doppler frequency shift is compensating the mobile link Doppler. Conventionally in FDMA satellite communication systems the frequency channels are divided into filters with each filter containing the same number of consecutive channels. In traditional methods, all kinds of frequency errors are corrected inside the SAN. Then employing large guard bands becomes unavoidable to the traditional methods because of the following three reasons. First, the maximum Doppler of the spot beams can be very large. Second, fractional Doppler is changing continuously from the center beam which has zero Doppler to the edge beam of maximum Doppler. Third, any spot beam must have the freedom of using any filter in order to use system resources efficiently. These guard bands occupy a big portion of system bandwidth in MEOS and LEOS and result in big waste of system bandwidth. For example, in one of the predominant global mobile satellite systems every six consecutive channels are grouped as one filter and a guard band of 25 kHz is allocated to each filter for the +/−11 kHz Doppler frequency shift in the worst case. In other words, the prior system bandwidth is wasted at $25/(25*6+25)*100\%=14.29\%$ as guard bands. In LEOS using guard bands will give a higher waste of system bandwidth because fractional Doppler is higher.

Figure 3:
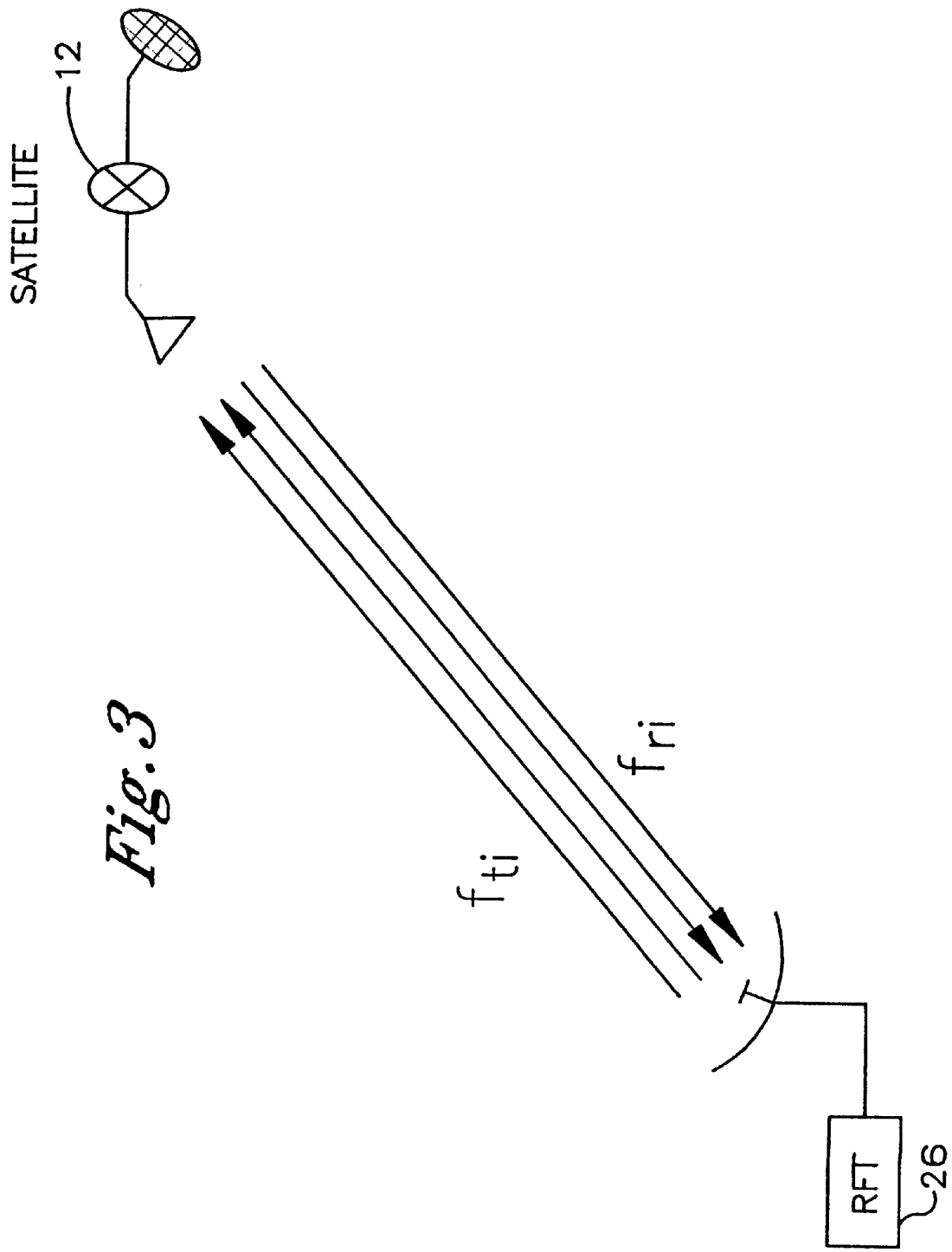
FIG. 3 shows feeder link pilot loops in measuring feeder link fractional Doppler and satellite translation error.

This embodiment compensates all of the frequency errors in such good ways that no guard band will be used and there will be no frequency error at the input of demodulator in either the SBS or UT. Two pilot tones are used to measure the instantaneous fractional Doppler between the RFT and the satellite transponder and the instantaneous satellite translation error. As shown in FIG. 3, the RFT measures the fractional Doppler and the fractional satellite translation error of the feeder link through two pilot loops via the satellite. For all of the spot beams this embodiment requires the RFT to perform the feeder link center Doppler correction, which dominates the Doppler frequency shift in feeder link. The feeder link residual Doppler and the satellite translation error are usually around several dozens of hertz. Varying from spot beam to spot beam, they are taken care of by the SBS.

In this embodiment the mobile link Doppler is corrected by UT under guidance from the SBS. More precisely the SBS calculates mobile link Doppler and send it to UT, and UT corrects it when transmitting and receiving. Compared with the conventional method in Doppler compensation, this embodiment has the advantages of using none of guard band and taking off UT's burden to calculate the Doppler frequency shift. The following are the main aspects for overcoming the waste of system bandwidth caused by large Doppler frequency shift in the traffic channel (TCH). For TCH in forward link, the SBS should precompensate the feeder link Doppler and the satellite translation error so that all of the TCH are perfectly aligned at satellite output. In other words, system bandwidth is used to 100% for forward link TCH when measured at the satellite antenna transmitting to UT. The mobile link Doppler is calculated by the SBS and sent to UT, and the correction is performed by UT when receiving. For TCH in return link, UT precorrects mobile link Doppler so that when received at satellite antenna all of the TCH will be perfectly aligned. Therefore, the system bandwidth is used to 100% for return link TCH when measured at satellite antenna.

Assume that a UT wants to make a call. This UT turns power on and starts search in a set of possible frequencies which is used for broadcast control channels (BCCH) and is in each UT's memory. For each spot beam there is a BCCH frequency assigned to send information for synchronization and system control. The BCCH frequency is precorrected by the SBS such that when received on median Doppler line of the corresponding spot beam, it is the nominal frequency remembered in UT memory. Median Doppler line of a spot beam is a curve any point of which has equal differential Doppler to the two edges of the spot beam along the normal line of that point, and any two points on the same median Doppler line have equal Doppler frequency shift. Using the nominal BCCH frequency for the spot beam, the fractional Doppler of the feeder link, the fractional Doppler of mobile link on the median Doppler line, the fractional satellite translation error, and the feeder-link to mobile-link translation frequency, the SBS derives its output frequency for each BCCH and corrects the mobile link Doppler, the feeder link residual Doppler, and the satellite translation error. To the SBS output BCCH frequency the RFT performs upconversion and feeder-link center Doppler correction. When a UT is on the median Doppler line of the spot beam, the received BCCH frequency is the nominal BCCH frequency.

Figure 4:
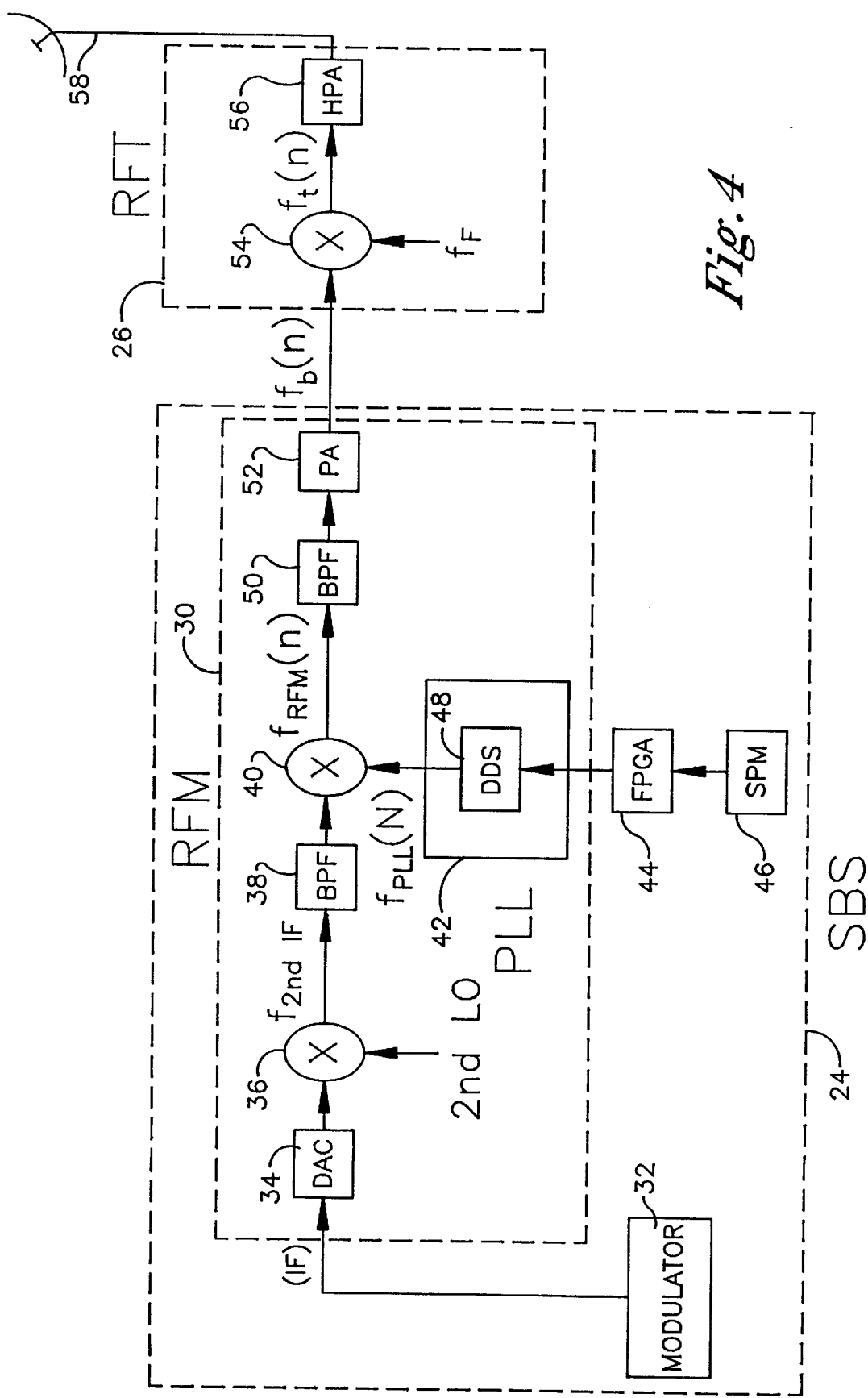
FIG. 4 shows the implementation of broadcast control channel (BCCH) frequency control at SAN.

FIG. 4 shows how to implement BCCH frequency control. The output signal of the modulator 32 at intermediate frequency (IF) is the input to the radio frequency module (RFM) 30. This signal passes through a digital-to-analog convertor (DAC) 34 and then upconverted to a fixed frequency $f_{2ndIF}$ by a first mixer 36 and filtered by a first bandpass filter (BPF) 38 in the RFM 30. This signal is further upconverted by a second mixer 40 which also multiplexes the channels in radio frequency and generate the output frequency of the RFM 30. The frequency relationship of this multiplexing mixer is $f_{RFM}(n)=f_{PLL}(n)-f_{2ndIF}$, where $f_{RFM}(n)$ equals the SBS output frequency for the n-th spot beam and is also the output frequency of the RFM 30, and $f_{PLL}(n)$ is the output frequency of a phase lock loop (PLL) 42. In order to generate this frequency $f_{PLL}(n)$, the slot processing module (SPM) 46 calculates it, maps it to a number, and passes this number to the field programmable gate array (FPGA) 44. At the right time the FPGA 44 programs the direct digital synthesizer (DDS) 48 which is a part of the PLL 42. Then the output frequency of the PLL 42 is $f_{PLL}(n)$. The output signal from the multiplexing mixer passes through a second bandpass filter 50 and a power amplifier (PA) 52. This gives the output signal of the RFM 30 in radio frequency, which is passed to the RFT 26. The RFT 26 performs the upconversion with a third mixer 54 and the feeder link center Doppler correction ($f_F$), passes the signal through a high power amplifier (HPA) 56, and then feeds the signal into an antenna 58 for transmission.

All of the information for synchronization is contained in the BCCH signal. Also the nominal carrier frequency for the access channel in the spot beam and the corresponding Doppler frequency shift in the mobile link are contained in the BCCH signal. After demodulating the BCCH signal, the UT needs to send access request through access channel at the frequency of the nominal carrier frequency for access channel plus its Doppler correction given by the BCCH. The satellite 12 translates this frequency from the mobile-link to the feeder-link. For all of the return links the RFT 26 performs center Doppler correction in feeder link and downconversion to IF. Before demodulation, the SBS 24 performs feeder link residual Doppler correction, satellite translation error correction, and downconversion to baseband. Now the baseband signal of the access channel contains a frequency offset contributed by the differential Doppler of the UT relative to the median Doppler line of its spot beam, which is small. The modem 28 inside the SBS 24 measures this frequency offset, use it to derive the differential fractional Doppler of the UT 16 relative to its median Doppler line, and precompensate this frequency offset before demodulation. This differential fractional Doppler can be used to determine UT's 16 position, as disclosed in co-pending application Ser. No. 09/212,528, entitled "An Efficient Method to Determine the Position of a User Terminal Using Measured Delay and Doppler of the Communications Link", filed Dec. 16, 1998.

Figure 5:
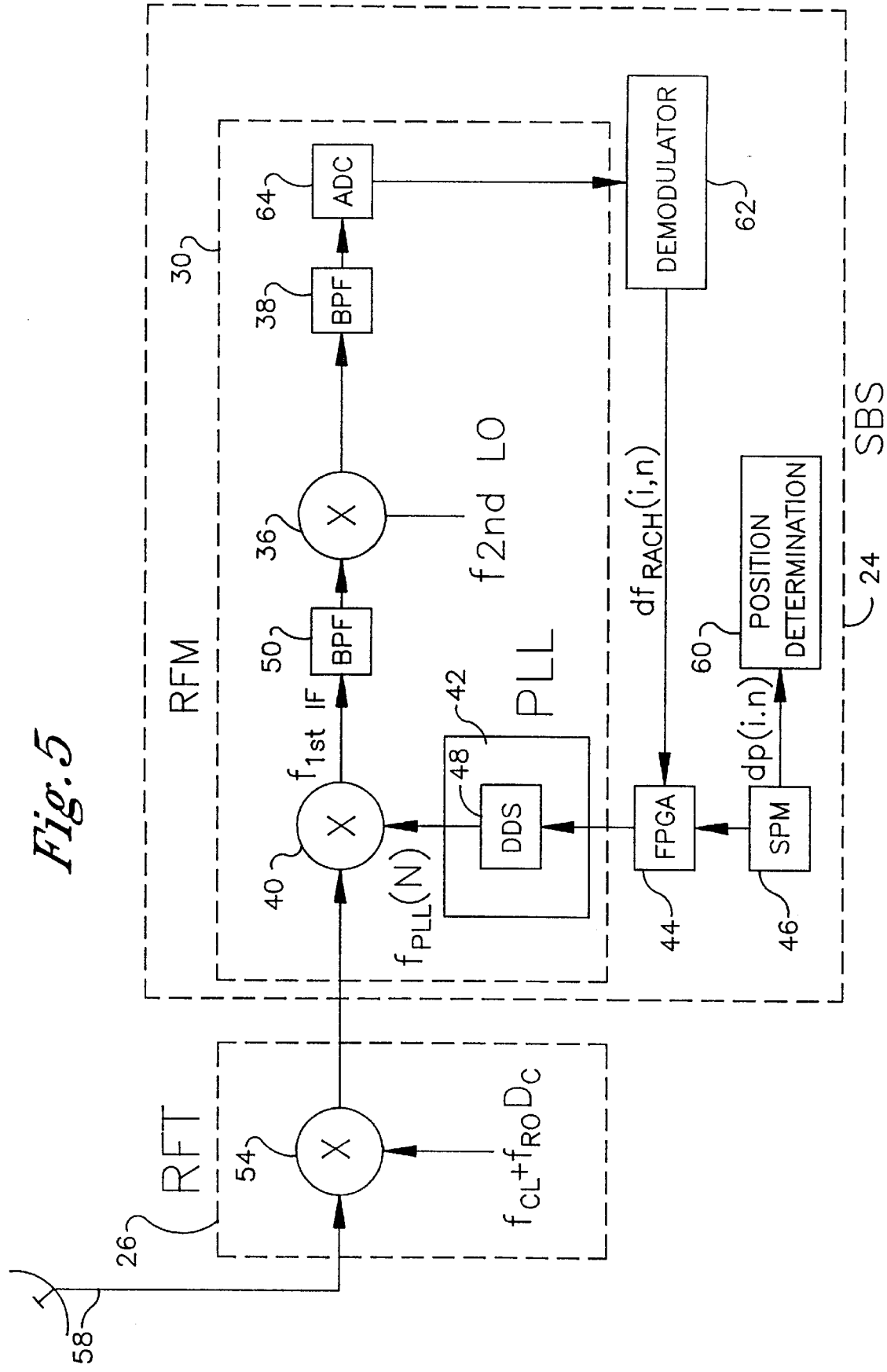
FIG. 5 shows the implementation of frequency offset measurement for access channel and UT fractional Doppler measurement at SAN.

The implementation of the access channel frequency offset measurement is shown in FIG. 5. The RFT 26 performs the downconversion and the center Doppler correction of the feeder link. At the RFM 30 the first mixer deducts the frequency $f_{PLL}(n)=f_{RACH}(n)-f_{1stIf}$ from this signal, where $f_{RACH}(n)$ is the frequency supposed to be received for UT 16 on median Doppler line and is calculated by the SPM 46 using the nominal frequency for access channel, the mobile-link to the feeder link translation frequency, the fractional translation error, and the feeder link fractional Doppler, and $f_{1stIF}$ is fixed. The frequency $f_{PLL}(n)$ is generated by the PLL 42 controlled by the FPGA 44 and the SPM 46 in the same way as for BCCH. The output signal of the first mixer is bandpass filtered and further downconverted by the second mixer and a bandpass filter. Then the signal is fed into the analog-to-digital convertor (ADC) 64 whose output signal is digital data in low IF range. The demodulator further converts it into baseband, measures its frequency offset, and sends this offset to the SPM 46. The SPM 46 derives the fractional Doppler of the UT 16 and passes it to the UT position determination module 60.

After the SAN 14 receives the access request from the UT 16, the SAN 14 allocates carrier frequencies $f^f_{TCH}(n)$ and $f^r_{TCH}(n)$ as TCH to the particular UT 16, in which $f^f_{TCH}(n)$ is the forward mobile link frequency and $f^r_{TCH}(n)$ is the corresponding return mobile link frequency. The SAN 14 sends these nominal frequencies and the corresponding mobile link Doppler frequency shifts to the UT 16 through access grant channel (AGCH) as pairs. The AGCH has forward link only and its Doppler is corrected in the same way as for BCCH. After the UT 16 receives these information through AGCH, the UT 16 begins to transmit TCH signal at the frequency $f^r_{TCH}(n)$ plus its Doppler correction. Then the received TCH frequency by satellite is the nominal frequency $f^r_{TCH}(n)$. The satellite translates this frequency to feeder link. The RFT 26 performs feeder link center Doppler correction and downconversion. The SBS 24 performs feeder link residual Doppler correction, satellite translation error correction, and downconversion to baseband. Therefore, at the input to the demodulator inside the SBS 24, there is no frequency error for traffic channel.

Figure 6:
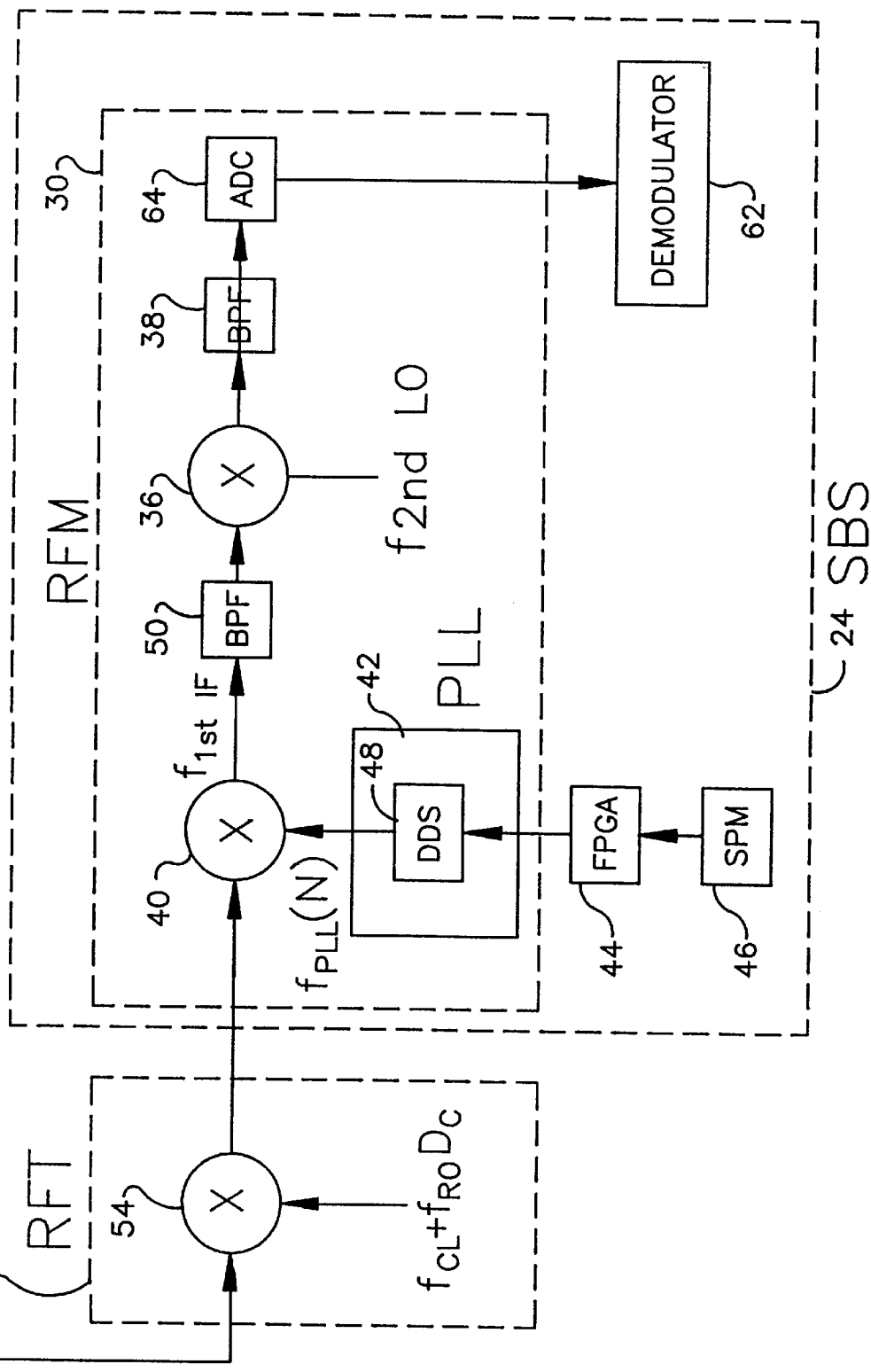
FIG. 6 shows TCH return link Doppler compensation at SAN.

FIG. 6 shows how to implement return link Doppler compensation for TCH. The RFT 26 performs downconversion and the center Doppler correction for the feeder link. At the SBS 24, the SPM 46 calculates the output frequency $f_{PLL}(n)$ of the PLL 42 by applying $f_{PLL}(n)=f^{RFT}_{TCH}(n)+f_{1stIF}$, where $f_{1stIF}$ is a fixed IF, and $f^{RFT}_{TCH}(n)$ is the RFT 26 received frequency calculated by the SPM 46 using the nominal frequency in return link traffic channel, the mobile-to-feeder link translation frequency, the fractional translation error, and the feeder link fractional Doppler. The SPM 46 maps $f_{PLL}(n)$ to a number to control the DDS 48 inside the PLL 42, and passes this number to the FPGA 44. Using this number, the FPGA 44 programs the DDS 48 at the right time such that the output frequency of the PLL 42 is $f_{PLL}(n)$. The first mixer inside the RFM 30 uses the received TCH signal and the output of the PLL 42 as its input, and outputs a TCH signal at $f_{1stIF}$. So the first mixer performs the residual Doppler correction in feeder link, the correction of satellite translation error, and downconversion. Its output of TCH signal has zero frequency offset. This signal passes through a BPF, the second mixer and the second BPF which together serve as a downconvertor to low IF. Then it is fed into an analog-to-digital convertor (ADC) 64. The ADC 64 serves as a sampler and outputs digital TCH signal at fixed and very low IF. As the input to the demodulator, this TCH signal has zero frequency offset. The demodulator converts this digital signal into baseband and performs demodulation.

For forward link TCH, the SBS 24 performs feeder link residual Doppler correction and satellite translation error correction. The RFT 26 performs feeder link center Doppler correction and upconversion. After the translation from feeder link to mobile link at the satellite, the transmission frequency of the satellite to the UT 16 is the exact nominal TCH frequency $f'_{TCH}(n)$. Since the pair of the nominal traffic channel frequency and its Doppler in the mobile link was already sent to the UT 16 via AGCH, the UT 16 tunes to the nominal frequency plus its Doppler to receive TCH signal transmitted from the SAN 14.

Figure 7:
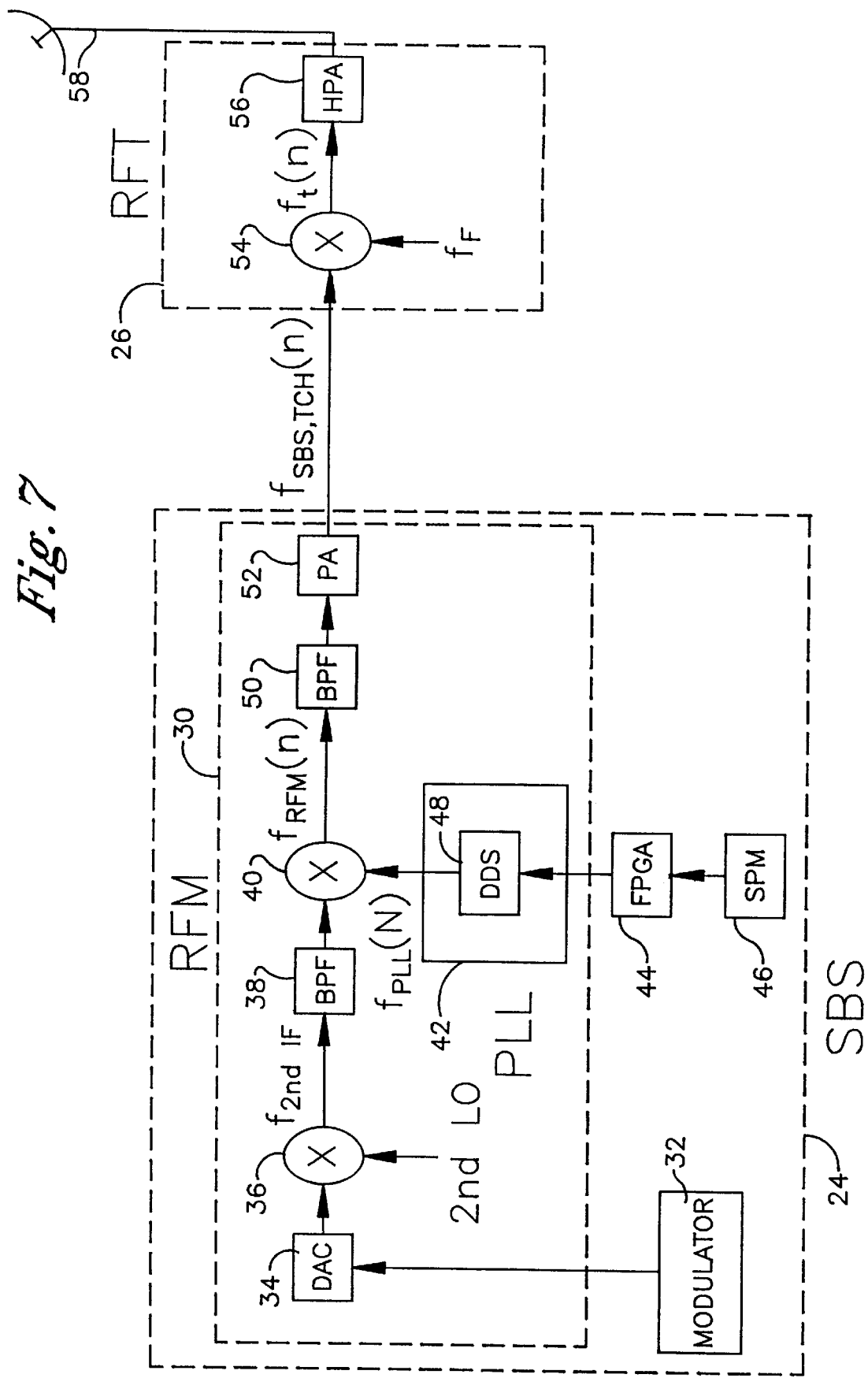
FIG. 7 shows TCH forward link Doppler compensation at SAN.

FIG. 7 is the block diagram of implementing forward link TCH Doppler compensation. The output frequency of the PLL 42 is $f_{PLL}(n) = f_{SBS,TCH}(n) + f_{2ndIF}$, where $f_{SBS,TCH}(n)$ is the SBS output frequency for forward traffic channel and is calculated by SPM 46 using the nominal traffic channel frequency, feeder link to mobile link translation frequency, feeder link fractional Doppler, and fractional translation error, and $f_{2ndIF}$ is fixed. The rest is the same as BCCH.

During a call the UT 16 transmission frequency may vary due to the motion and the oscillator drift of the UT 16. This kind of UT frequency error can be detected by the SBS and predicted by a Kalman filter implemented inside the SBS 24. The SBS 24 sends this error to the UT 16. Then the UT 16 can correct this error with the advises from the SBS 24.

For systems in which the total transmission delay from the SBS 24 to the UT 16 is not negligible, the implementation of this embodiment may be modified in the following ways. For the access channel, the BCCH should contain the nominal carrier frequency, the instantaneous mobile link fractional Doppler, and its rate of change to time with time stamp. Assume at time instant t a UT wants to send an access request to the SAN and the latest fractional Doppler the UT received was stamped at time instant $t_0$. Then the UT calculates the Doppler frequency shift at time instant t using the fractional Doppler and its rate of change at the time instant $t_0$. Then the UT sends access request at the nominal frequency of the access channel plus the calculated Doppler correction. For TCH, the SAN sends to the UT time-stamped fractional Doppler and its rate of change along with the nominal frequencies for the traffic channel. When the UT sends its first burst of TCH signal, the UT constructs its instantaneous fractional Doppler using its latest fractional Doppler and its rate of change. Then the UT calculates its instantaneous TCH Doppler frequency shift. The UT sends its first TCH burst at the nominal frequency plus its instantaneous Doppler correction. When setting up to receive TCH signal from the SAN, the UT calculates its instantaneous TCH Doppler frequency shift in forward link by using the nominal traffic channel frequency, the latest fractional Doppler and its rate of change. Then the UT tunes to the nominal traffic channel frequency plus the instantaneous Doppler to receive TCH signal from the SAN.

For simplicity the rate of change of the fractional Doppler of the UT can be approximated by the rate of change of the fractional Doppler on the median Doppler line and the error caused by this approximation is negligible. By doing this the SBS does not need to measure the rate of change of the UT Doppler, because the rate of change of the fractional Doppler on the median Doppler line can be derived by the SBS from satellite orbit.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A communication system providing a feeder link to an earth orbiting satellite transponder having a mobile link illuminating several spot beams with associated access, control and traffic channels for multiple user terminals on the earth, the system comprising:
    means for using the satellite transponder as a reference point to correct for dynamic Doppler caused by satellite motion;
    means for performing Doppler correction for each of the channels of the feeder link to the satellite transponder;
    means for calculating Doppler frequency shift in the mobile link between the satellite transponder and a median Doppler line of each spot beam on the earth;
    means for using the calculated Doppler frequency shift in the mobile link to establish a forward link to the user terminals via the satellite transponder such that when the signal of each control channel is received by any user terminal on the median Doppler line of each spot beam, the carrier frequency of the control channel is received by the user terminal at a preassigned nominal frequency;
    means for measuring the user terminal Doppler over the access channel and for deriving the Doppler frequency in the traffic channel from the measured Doppler in the access channel of the user terminals; and
    means for facilitating a forward link and a return link over the traffic channel between the user terminal and a satellite base station via the satellite transponder for achieving minimal frequency error at the input of demodulators of the user terminal and the satellite base station.

2. A system as recited in claim 1, comprising:
    means for broadcasting information over the control channel identifying an access channel frequency to the user terminals; and
    means for broadcasting information over the control channel identifying said Doppler frequency shift in the mobile link relative to the median Doppler line for the user terminals.

3. A system as recited in claim 2, wherein said means for facilitating the return link uses said identified access channel frequency and said Doppler frequency shift in the mobile link for precompensation of the carrier frequency of the access channel by the user terminal for optimal use of the access channel bandwidth when the transmission delay is large.

4. A system as recited in claim 3, comprising means for deriving a fractional Doppler frequency shift from the user terminal return link signals via said access channel of the mobile link.

5. A system as recited in claim 4, wherein said means for deriving the fractional Doppler frequency shift via said access channel is used for compensation of the carrier frequency of the access channel signals transmitted by the user terminal.

6. A system as recited in claim 5, comprising means for sending information over said access grant channel to the user terminal identifying said Doppler frequency shift in the mobile link for both the forward and return links for compensation of the carrier frequency of traffic channel signals transmitted and received by the user terminal.

7. A system as recited in claim 6, wherein said means for performing Doppler correction for each of the channels of the feeder link to the satellite transponder precorrects the feeder link residual Doppler and the satellite translation error.

8. A communication system providing a feeder link to an earth orbiting satellite transponder having a mobile link illuminating several spot beams with associated access, control and traffic channels for multiple user terminals on the earth, the system comprising:

a satellite access node (SAN) for using the satellite transponder as a reference point to correct for satellite motion, comprising:

a radio frequency terminal (RFT) for performing center Doppler correction and up or down conversion for each of the channels of the feeder link to the satellite transponder; and a satellite basestation subsystem (SBS) for calculating Doppler frequency shift in the mobile link between the satellite transponder and a median Doppler line of each spot beam on the earth, wherein said SBS uses the calculated Doppler frequency shift in the mobile link to establish a forward link to the user terminals via the satellite transponder such that when the signal of each control channel is received by any user terminal on the median Doppler line of each spot beam, the carrier frequency of the control channel is received by the user terminal at a preassigned nominal frequency.

9. A system as recited in claim 8, wherein said SAN facilitates a return link over the access channel from the user terminal via the satellite transponder for efficient use of the access channel bandwidth.

10. A system as recited in claim 9, wherein said return link over the access channel from the user terminal to the SAN provides closed-loop dynamic frequency control using the calculated Doppler frequency shift in the mobile link for precompensation of the carrier frequency of the access channel by the user terminal.

11. A system as recited in claim 9, wherein said SBS broadcasts information over the control channel identifying an access channel frequency and said Doppler frequency shift in the mobile link relative to the median Doppler line to the user terminals.

12. A system as recited in claim 11, wherein said SBS uses said identified access channel frequency and said Doppler frequency shift in the mobile link for precompensation of the carrier frequency of the access channel by the user terminal for efficient use of the access channel bandwidth.

13. A system as recited in claim 12, wherein said SBS measures differential Doppler and derives a fractional Doppler frequency shift from the user terminal return link signals via said access channel of the mobile link.

14. A system as recited in claim 13, wherein said SBS provides compensation of the carrier frequency of the access channel signals transmitted by the user terminal.

15. A system as recited in claim 14, wherein said SAN sends information over said access grant channel to the user terminal identifying said fractional Doppler frequency shift in the mobile link for both the forward and return links for compensation of the carrier frequency of traffic channel signals transmitted and received by the user terminal.

16. A system as recited in claim 15, comprising a satellite resource management center (SRMC) in communication with the SBS of the SAN for assigning nominal traffic channel carrier frequencies for the satellite transponder.

17. A system as recited in claim 15, wherein said SBS precorrects the feeder link residual Doppler and the satellite translation error for each of the channels of the feeder link to the satellite transponder.

18. A communication method providing a feeder link to an earth orbiting satellite transponder having a mobile link illuminating several spot beams with associated access and control channels for multiple user terminals on the earth, the method comprising:

using the satellite transponder as a reference point to correct for dynamic Doppler caused by satellite motion;

performing Doppler correction for each of the channels of the feeder link to the satellite transponder;

calculating Doppler frequency shift in the mobile link between the satellite transponder and a median Doppler line of each spot beam on the earth;

using the calculated Doppler frequency shift in the mobile link to establish a forward link to the user terminals via the satellite transponder such that when the signal of each control channel is received by any user terminal on the median Doppler line of each spot beam, the carrier frequency of the control channel is received by the user terminal at a preassigned nominal frequency;

broadcasting information over the control channel identifying an access channel frequency to the user terminals;

broadcasting information over the control channel identifying the Doppler frequency shift in the mobile link relative to the median Doppler line for the user terminals; and facilitating a return link over the access channel from the user terminal via the satellite transponder using the identified access channel frequency and the calculated Doppler frequency shift in the mobile link with precompensation of the carrier frequency of the access channel by the user terminal for efficient use of the access channel bandwidth.

19. A method as recited in claim 18, further comprising measuring differential Doppler and deriving a fractional Doppler frequency shift from the user terminal return link signals via the access channel of the mobile link.

20. A method as recited in claim 19, wherein said deriving of the fractional Doppler frequency shift via said access channel facilitates compensation of the carrier frequency of the access channel signals transmitted by the user terminal, further comprising sending information over said access grant channel to the user terminal identifying said fractional Doppler frequency shift in the mobile link for both the forward and return links for compensation of the carrier frequency of traffic channel signals transmitted and received by the user terminal.

21. A method as recited in claim 20 comprising the step of calculating the traffic channel Doppler by a satellite base station and sending information relating to the traffic channel Doppler to the user terminal.

22. A method as recited in claim 21 comprising the step of correcting the traffic channel Doppler at the user terminal for the mobile link under guidance of the satellite base station to facilitate efficient use of the satellite communication access and traffic channel bandwidth.

23. A method as recited in claim 21 comprising the step of compensating for frequency errors before the signal input to demodulators of the user terminal and satellite base station to achieve minimal frequency error at the input of the demodulator in a large transmission delay environment.

24. A method as recited in claim 19 comprising the step of determining the user terminal position from the derived fractional Doppler frequency shift from the return link signals via the mobile link.

* * * * *